United States Patent [19]

Harkness et al.

[11] Patent Number: 5,282,397
[45] Date of Patent: Feb. 1, 1994

[54] ENGINE BALANCING SYSTEM HAVING AT LEAST ONE PIVOTING COUNTERBALANCE WEIGHT

[75] Inventors: Joseph R. Harkness, Germantown; Patrick J. Bruener, Hartland; William R. Frank, Brookfield, all of Wis.

[73] Assignee: Briggs & Stratton Corporation, Wauwatosa, Wis.

[21] Appl. No.: 855,059
[22] Filed: Mar. 19, 1992
[51] Int. Cl.$^5$ .............................................. F16C 3/04
[52] U.S. Cl. .................................... 74/603; 74/44; 74/591; 123/192.1
[58] Field of Search ................. 74/44, 590, 603, 604; 123/192.1, 192.2

[56] References Cited

U.S. PATENT DOCUMENTS

| | | | |
|---|---|---|---|
| 1,342,648 | 6/1920 | Ricardo | 74/604 |
| 1,654,515 | 12/1927 | Tompkins | 74/604 |
| 1,762,860 | 6/1930 | Gilbert | 74/604 |
| 2,093,495 | 9/1937 | Thompson | 74/44 |
| 3,112,658 | 12/1963 | Berlyn | 74/603 |
| 3,402,707 | 9/1968 | Heron | 123/192.2 |
| 3,415,237 | 12/1968 | Harkness | 123/192.2 |
| 3,422,688 | 1/1969 | Bruderer | 74/590 X |
| 3,520,285 | 7/1970 | Klauder, Jr. | 123/56 BA |
| 3,903,995 | 9/1975 | Irgens | 184/27 |
| 4,074,589 | 2/1978 | Nakamura et al. | 743/604 |
| 4,174,698 | 11/1979 | Dupin | 123/192.2 |
| 4,290,395 | 9/1981 | Sakano et al. | 123/192.2 |
| 4,300,405 | 11/1981 | Szczepanek | 74/44 |
| 4,386,512 | 6/1983 | Rehang et al. | 72/214 |
| 4,386,589 | 6/1983 | Hatz et al. | 123/192.2 |
| 4,414,934 | 11/1983 | Vogl et al. | 123/192.2 |
| 4,509,378 | 4/1985 | Brown | 74/44 |
| 4,616,608 | 10/1986 | Shiga | 123/192.2 |
| 4,617,885 | 10/1986 | Oshiro et al. | 123/192.2 |
| 4,628,876 | 12/1986 | Fujikawa et al. | 123/192.2 |
| 4,648,359 | 3/1987 | Ito | 123/90.31 |
| 4,741,303 | 5/1988 | Kronich | 123/192.2 |
| 4,800,777 | 1/1989 | Imanishi et al. | 74/590 X |
| 4,819,593 | 4/1989 | Bruener et al. | 123/192.1 |
| 5,138,922 | 8/1992 | Eigenmann | 74/603 X |

FOREIGN PATENT DOCUMENTS 217244 2/1961 Austria .
886890 11/1981 Canada .

OTHER PUBLICATIONS

Nakano et al. "Present and Future of Countermeasures for Noise and Vibration Problems of Small Passenger Cars", 1979.
Lombardini technical brochure entitled "Dynamic Balancer", published at least as early as 1976.
"Present and Future of Countermeasures for Noise . . . ", JSAE Review, Mar. 1981.
"Fundamentals of Automotive Engine Balance", Thomson, W., 1978 pp. 6-19, 94 and 95.

Primary Examiner—Leslie A. Braun
Assistant Examiner—David W. Laub
Attorney, Agent, or Firm—Andrus, Sceales, Starke & Sawall

[57] ABSTRACT

The engine balancing system preferably has two pivoting counterbalance weights connected to eccentric journals on the crankshaft via their respective link arms. The use of the two pivoting weights and the particular geometrical relationships between the balancing system components enable the balancing system to substantially mimic and oppose the non-sinusoidal piston forces. Several methods of balancing the non-sinusoidal piston forces are disclosed. In a first method, the centers of gravity of the respective counterbalance weights are moved at non-sinusoidal angular accelerations. These angular accelerations are greater when the piston is near its Top Dead Center position than when the piston is near its Bottom Dead Center position to yield higher balancing forces when the piston is near Top Dead Center. In a second method, the centers of gravity move through arcs which are substantially parallel to the piston axis when the piston is near its Top Dead Center position, and move in directions less parallel to the piston axis when the piston is near its Bottom Dead Center position. The movement of the centers of gravity parallel to but in the opposite direction from the moving piston when the piston is near Top Dead Center results in greater balancing forces when the piston is near Top Dead Center. The invention also includes a combined method of balancing the non-sinusoidal piston forces. In this combined method, the angular accelerations of the centers of gravity vary as in the first method, and the directions of movement of the centers of gravity vary as in the second method.

20 Claims, 14 Drawing Sheets

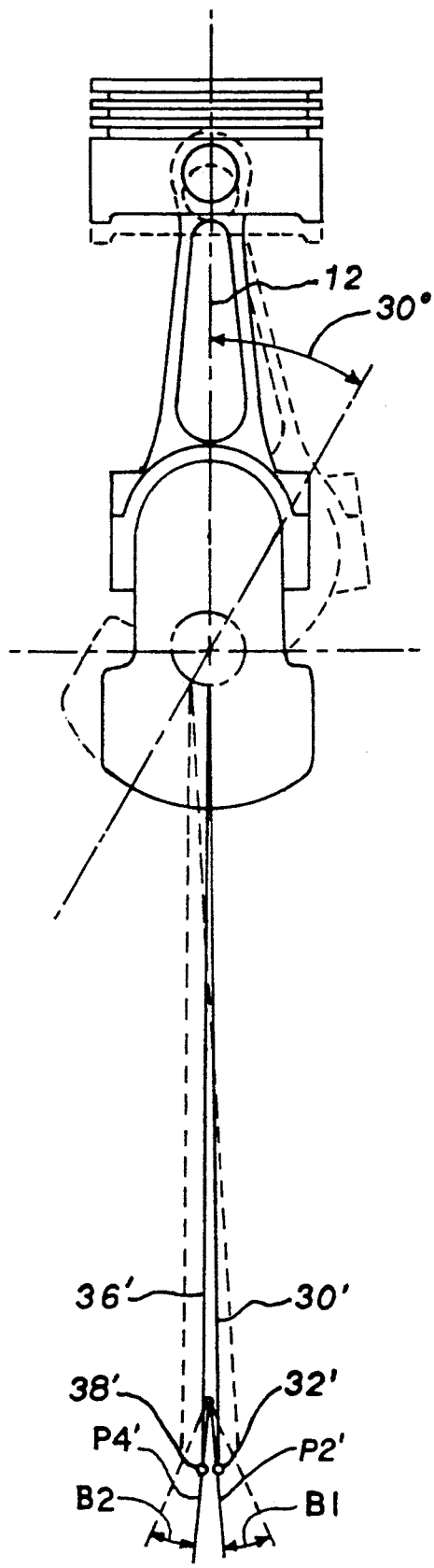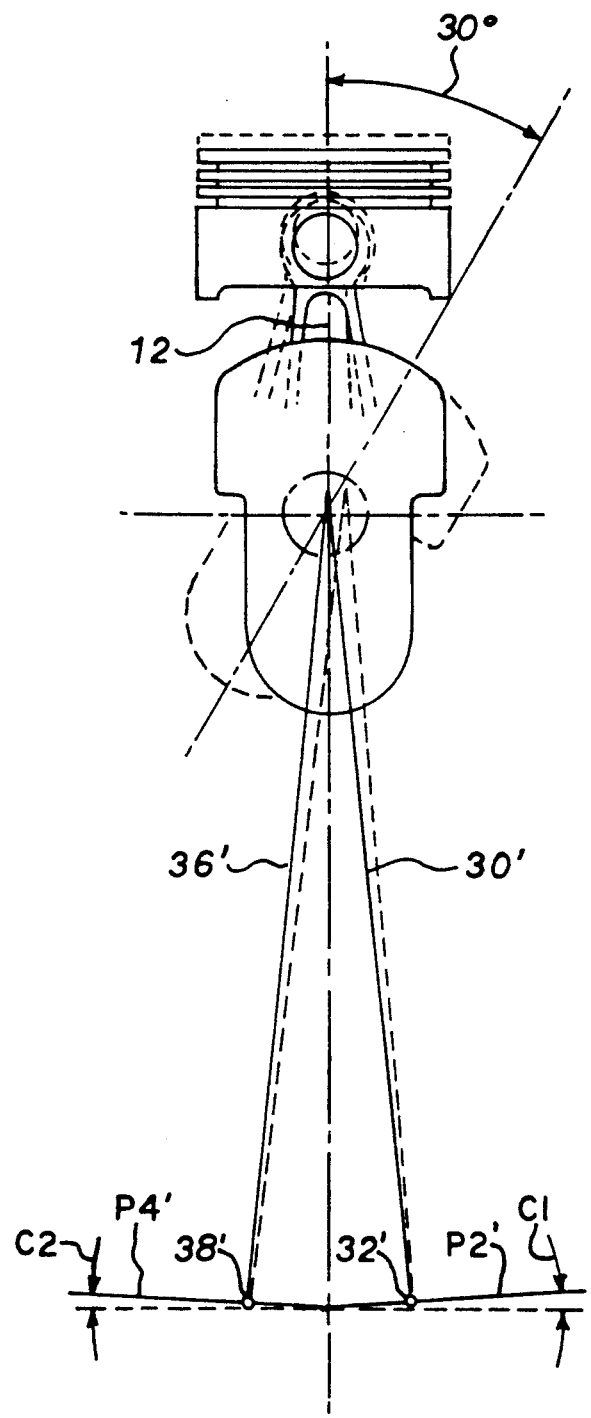
FIG. 15A
FIG. 15B

ENGINE BALANCING SYSTEM HAVING AT LEAST ONE PIVOTING COUNTERBALANCE WEIGHT

BACKGROUND OF THE INVENTION

This invention relates to engines such as those used to power garden tractors, lawnmowers, sump pumps, portable generators, snow blowers and the like. More particularly, this invention relates to a counterbalance weight system for canceling the primary and higher order vibrational forces in a single cylinder engine resulting from piston reciprocation.

A major cause of vibration in a single cylinder engine is piston reciprocation. The piston is started and stopped twice during each rotation of the crankshaft, and reactions to the forces which accelerate and decelerate the piston are imposed upon the engine body as vibration in directions generally parallel to the piston axis. In installations such as garden tractors, lawnmowers and the like, the engine produces a vibration that is transmitted through the machine to the operator. This vibration is uncomfortable and could produce operator fatigue. Even in an installation where there is no element of operator fatigue such as sump pumps or portable generators, engine vibration is undesirable because it causes maintenance problems and tends to reduce the useful life of the machine.

To some extent such vibrations can be decreased by providing the engine with a counterweight fixed on its crankshaft, and located at the side of the crankshaft axis directly opposite the crankpin by which the piston, through the connecting rod, is connected to the crankshaft. More commonly, two counterweights may be used on the crankshaft, one located on each side of the piston axis. In either case, such a crankshaft counterweight arrangement produces a net resultant centrifugal force vector that is diametrically opposite to the crankpin.

If the mass of the crankshaft counterweights is great enough, their net force vector parallel to the piston axis cancels the acceleration and deceleration primary forces on the piston assembly. Such a force canceling condition exists when the crankshaft counterweights are of such mass and radius of gyration that their combined centrifugal force totally cancels the centrifugal force due to the rotating masses of the crankpin and the crank end of the connecting rod. When the counterweights are even larger, the vector component parallel to the cylinder axis of the counterweights' additional combined centrifugal force completely offsets the primary (first order) acceleration and deceleration forces of the piston. Such counterweighting may be called a condition of 100% overbalance.

Unfortunately, centrifugal force due to the crankshaft counterweights also has a component transverse to the piston axis. This produces lateral vibration. If the mass of the crankshaft counterweights produces 100% overbalance, the vibration transverse to the piston axis is excessive for practical purposes. For this reason most single cylinder engines incorporate crankshaft counterweights having a mass that provides a condition of about 50% overbalance, so that the centrifugal force due to the counterweight overbalance has a component along the cylinder axis that is equal to about 50% of the acceleration and deceleration forces on the piston assembly. This represents a compromise between the severe vibration in directions parallel to the piston axis that would result with the condition of no overbalance, and the severe vibration transverse to the piston axis that would result with the condition of 100% overbalance. With this compromise condition of about 50% overbalance, there is of course some vibration parallel to the cylinder axis and some vibration transverse to it. Unsatisfactory as it is, the use of crankshaft counterweights to provide condition of about 50% overbalance is a typical balance system utilized with small commercially available engines of this type.

Other prior art systems have one or more counter-rotating balance shafts and associated counterbalance weights in addition to the crankshaft counterweights. With this type of system, the combination of the crankshaft counterbalance weights and the counter-rotating balance shaft or shafts provides forces that cancel the primary piston inertia forces, without creating undesirable forces transverse to the cylinder axis.

Unfortunately, the counter-rotating balance shaft methods do not balance the higher order forces, and in fact some designs introduce torsional or rocking forces on the engine. When the net force of all counterbalances is not located on the piston axis, force couples remain and vibrate the engine rotationally.

Rocking forces are not generated when two counterbalancing shafts are used as depicted in FIGS. 1A and 1B, with one shaft being located on each side of the piston axis. The crankshaft counterbalance weights are just sufficient to balance the crankpin and the large end of the connecting rod, but provide no balancing for the piston and the upper end of the connecting rod. Primary piston forces are balanced by the counter-rotating weights, but this balancing is not perfect. The main reason that the piston forces are not totally balanced is that the piston forces are not truly sinusoidal, while the counter-rotating balancer forces are sinusoidal. Because of the nature of the slider-crank mechanics, the piston forces are highest near Top Dead Center (TDC), cross zero when the piston is located about halfway in the cylinder bore, and have an intermediate (reversed) value when the piston is near Bottom Dead Center (BDC).

Prior art balancing methods typically do not take into account the non-sinusoidal nature of the piston forces. Although prior art methods may counterbalance the primary forces, they typically do not entirely counterbalance higher order forces, as depicted in FIGS. 2A and 2B. FIG. 2A is a graph depicting the piston force curve and the balancer force curve in a typical prior art one-cylinder engine with counter-rotating balance shafts. FIG. 2B depicts the net force curve of the piston and balancer forces in FIG. 2A.

The net forces are essentially sinusoidal in nature and have a predominant frequency twice that of the primary forces. These "secondary" forces have lower values than the primary forces, but they are high enough to cause vibration-related failures and operator discomfort. There are also forces of a higher order than the secondary forces, but these higher order forces are of such a low magnitude that they may be disregarded.

Other prior art methods use oscillating counterbalance schemes. Since it is an oscillating mass (the piston) that produces the vibration, single cylinder engines have for a number of years been balanced by a mass oscillated in a direction opposite to the piston movement. U.S. Pat. No. 3,457,804 to Harkness discloses such a system. This system has the advantage of minimizing unwanted lateral vibrations, and does not require additional gearing in the engine. While it is theoretically possible to balance higher order vibrations by this method, it requires that the ratio of connecting rod length to eccentric radius of the balancer be the same as that of the engine. Typically, the oscillating counterbalance has been made quite heavy and given a very short stroke to keep the engine compact. This configuration makes it impractical to give the balancer the same ratio of connecting rod length to crank (eccentric) throw as the connecting rod to crank throw ratio. The result is that the oscillating counterbalance has little cancellation of higher order forces since its oscillating motion is nearly sinusoidal.

SUMMARY OF THE INVENTION

An improved counterbalancing means is provided for balancing the primary and secondary forces in an internal combustion engine. This invention provides a non-sinusoidal balancing means for the piston.

In its broadest concept, the improved counterbalancing means includes a first counterbalance weight having a first center of gravity located on a first side of the piston axis, the first center of gravity moving in a first arc during piston reciprocation. The counterbalancing means also preferably includes a second counterbalance weight located on the second, opposite side of the piston axis and having a second center of gravity that moves in a second arc during piston reciprocation. Both the first and second counterbalance weights are pivotally connected to the crankshaft by a drive means. The drive means preferably includes first and second link arms, both arms having one end engaging the crankshaft via their respective eccentric journals, and both having a second end engaging their respective counterbalance weights.

A pivot means is also provided for pivotally connecting the first and second counterbalance weights to the crankcase. In one embodiment, the pivot means consists of a central stationary pivot mounted to the crankcase and pivotally engaged with both the first counterbalance weight and with the second counterbalance weight.

In another embodiment, the pivot means comprises a first boss projecting from the crankcase and a first pin that pivotally connects the first counterbalance weight to the crankcase, and a second boss projecting from the crankcase and a second pin that pivotally connects the second counterbalance weight to the crankcase.

In each of the embodiments, the two counterweight centers of gravity travel in a manner designed to mimic and to oppose the non-sinusoidal piston forces. The movements and coupling geometry of the system are chosen such that more counterbalancing occurs when the piston is near Top Dead Center (TDC). Counterweight and link geometry is such that the force components of the centers of gravity that act in opposition to the piston forces are greater when the piston is near Top Dead Center and less when the piston is near Bottom Dead Center.

Because the piston inertial force is nonsinusoidal, the counterbalancing system should also duplicate this non-sinusoidal force for optimal balancing. There are two methods for producing the desired non-sinusoidal force according to the present invention. The preferred embodiment of the present invention combines the two methods for best results, but the two methods may be used separately.

In the first method of producing the nonsinusoidal balancing forces, the accelerations of the two centers of gravity of the counterbalance weights are greater when the piston is near its Top Dead Center position than when the piston is near its Bottom Dead Center position, since less balancing is needed when the piston is near its Bottom Dead Center position. Since the centers of gravity move in opposite directions to the piston, the non-sinusoidal piston forces are balanced.

In the second method of producing the nonsinusoidal forces, the arcs through which the centers of gravity move are positioned so that the directions of movement of the centers of gravity are more closely parallel to the piston axis when the piston is near its Top Dead Center position than when the piston is near its Bottom Dead Center position, but the centers of gravity movements are in the opposite direction from the piston movement. This arrangement also results in greater counterbalancing forces when the piston is near Top Dead Center than when the piston is near Bottom Dead Center.

Particular spatial arrangements and orientations are disclosed for the components of the balancing system to enable one skilled in the art to design balancing systems under the first method, the second method and a combined method that includes features of both the first method and the second method.

It is a feature and advantage of the present invention to provide a counterbalancing system for internal combustion engines which balances the secondary forces as well as the primary forces.

It is yet another feature and advantage of the present invention to provide a counterbalancing system which generates approximately equal, opposing forces to the non-sinusoidal forces imparted by the reciprocating piston.

It is yet another feature and advantage of the present invention to provide a counterbalancing system in which the vector representing the sum of the balancing forces is on the piston axis.

These and other features and advantages of the present invention will be apparent to those skilled in the art from the following detailed description of preferred embodiments and the drawings, in which:

BRIEF DESCRIPTION OF THE DRAWINGS

FIG. 1A depicts the balancing system when the piston is at its Top Dead Center (TDC) position. FIG. 1B depicts the balancing system when the piston is at its Bottom Dead Center (BDC) position.

FIG. 2A depicts the piston and balancer forces. FIG. 2B depicts the net force curve corresponding to the piston and balancer forces depicted in FIG. 2A.

FIG. 3A depicts the piston at its Top Dead Center position. FIG. 3B depicts the piston at its Bottom Dead Center position.

FIG. 4A is a graph depicting the piston versus balancer forces. FIG. 4B depicts the net force curve of the piston and balancer force curves depicted in FIG. 4A.

FIG. 5A depicts the piston at its Top Dead Center position. FIG. 5B depicts the piston at its Bottom Dead center position.

FIG. 6A depicts the piston and balancer forces. FIG. 6B depicts the net force of the piston and balancer forces of FIG. 6A.

FIG. 7A depicts the balancing system when the piston is at its Top Dead Center position. FIG. 7B depicts the balancing system when the piston is at its Bottom Dead Center position.

FIG. 8A depicts the piston and balancer forces. FIG. 8B depicts the net force curve of the piston and balancer forces depicted in FIG. 8A.

FIG. 9A depicts the balancing system when the piston is at its Top Dead Center position. FIG. 9B depicts the balancing system when the piston is at its Bottom Dead Center position.

FIG. 12A depicts the balancing system when the piston is at its Top Dead Center position. FIG. 12B depicts the balancing system when piston is at its Bottom Dead Center position.

FIGS. 15A and 15B are conceptual diagrams of a three-bar linkage incorporating the first method of achieving non-sinusoidal forces. FIG. 15A depicts the motion of the balancing system when the piston is at Top Dead Center and at 30° after Top Dead Center. FIG. 15B depicts the balancing system when the piston is at Bottom Dead Center and at 30° Bottom Dead Center.

DETAILED DESCRIPTION OF THE PREFERRED EMBODIMENTS

Figure 1A:
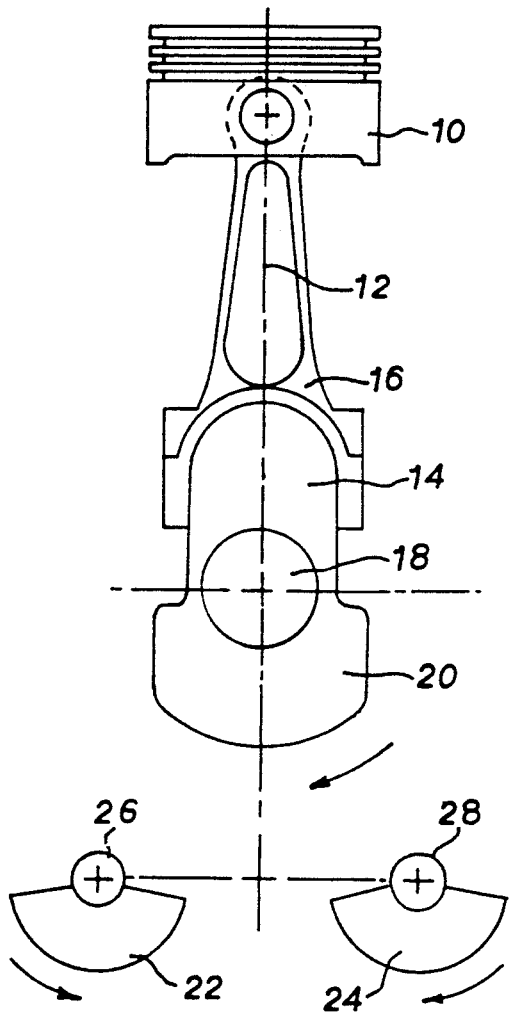
FIGS. 1A and 1B are plan views of a prior art balancing system having two counter-rotating counterbalance weights.
Figure 1B:
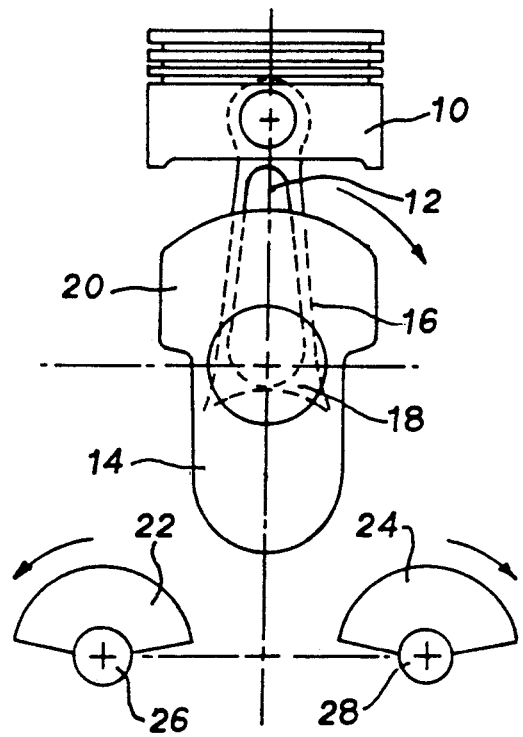

FIGS. 1A and 1B depict a prior art balancing system in which two counterbalance weights are used. In FIGS. 1A and 1B, piston 10 reciprocates in a piston bore (not shown) along a piston axis 12. The piston reciprocates between a Top Dead Center (TDC) position as depicted in FIG. 1B. The piston is connected to the crank pin (not shown) and a throw 14 via a connecting rod 16. The crank pin rotates about crankshaft journals 18. The rotational forces resulting from the rotating crank pin, throw 14, and the larger end of connecting rod 16 are balanced by a pair of counterweights 20 interconnected therewith.

The piston forces are approximately balanced by two counter-rotating counterbalance weights 22 and 24. Counterbalance weight 22 rotates about the axis of shaft 26, and weight 24 rotates about the axis of shaft 28.

Figure 2:
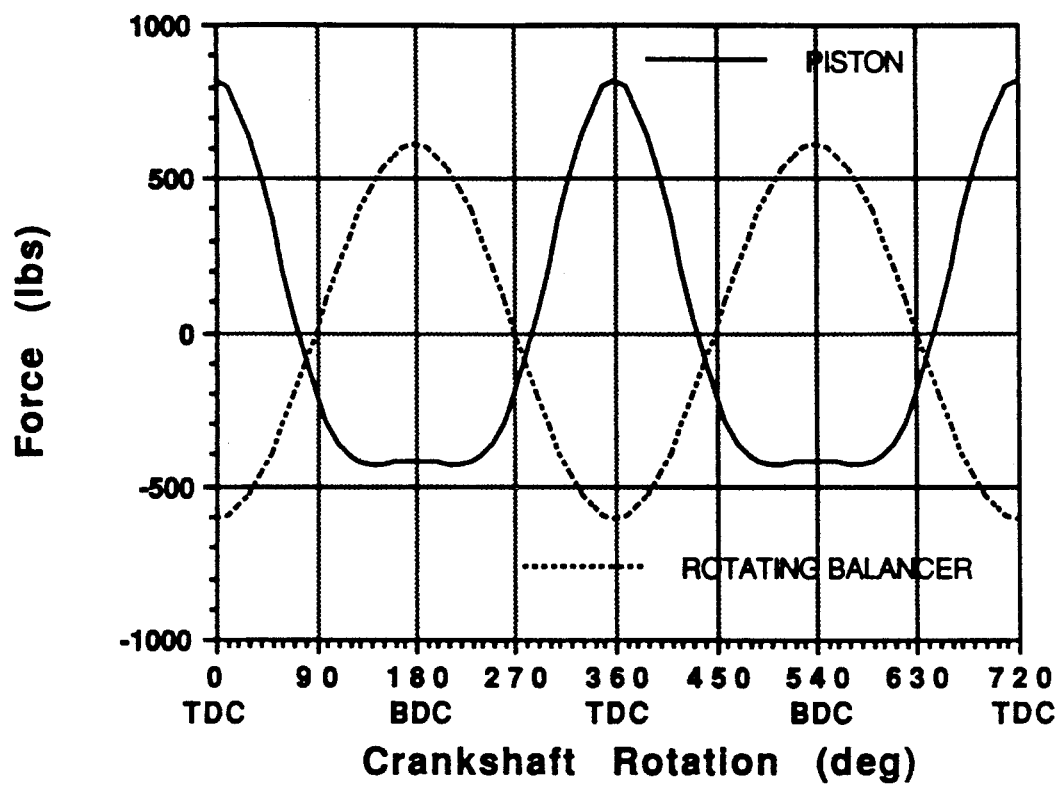
FIGS. 2A and 2B are force curves relating to the prior art system depicted in FIGS. 1A and 1B.
Figure 2:
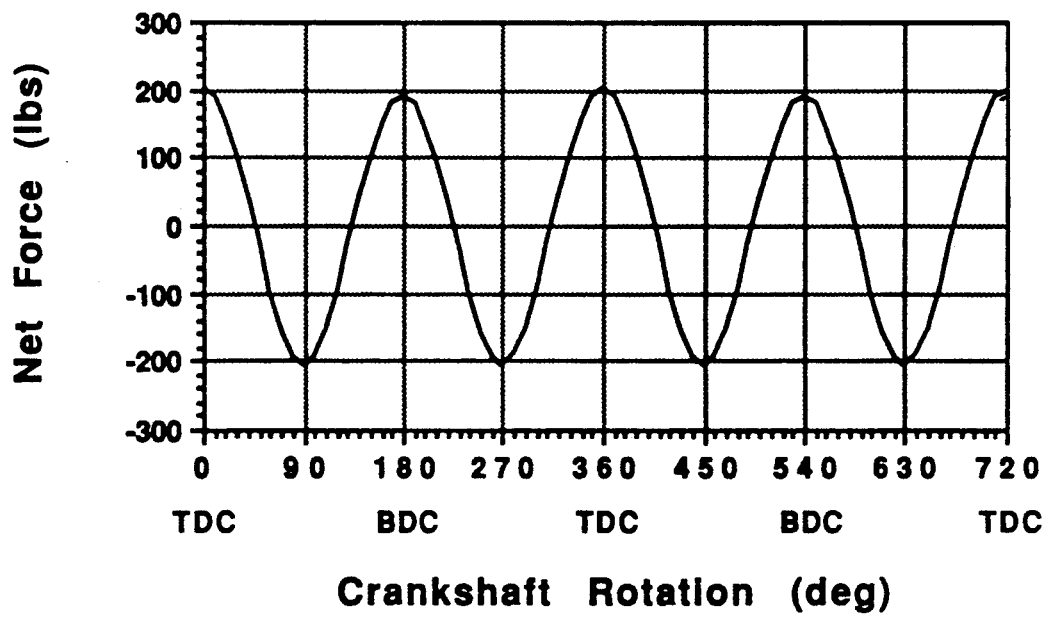

As best shown in FIG. 2A, the balancing forces generated by counterbalance weights 22 and 24 are essentially sinusoidal. However, the piston forces are not sinusoidal, since they are smaller when the piston is near its Bottom Dead Center (BDC) position than when the piston is near its Top Dead Center (TDC) position. The non-sinusoidal nature of the piston forces, when combined with the sinusoidal nature of the balancer forces, results in a relatively large net force, as depicted in FIG. 2B.

The primary objective of the present invention is to mimic and oppose the non-sinusoidal piston forces in a balancing system. A single counterbalance weight may be used according to the present invention to achieve the non-sinusoidal balancing forces. However, the side-to-side forces of the single counterbalance weight would not be counterbalanced as in a two counterbalance weight system. Thus, it is preferred that two counterbalance weights be used, as depicted and described herein.

Figure 3A:
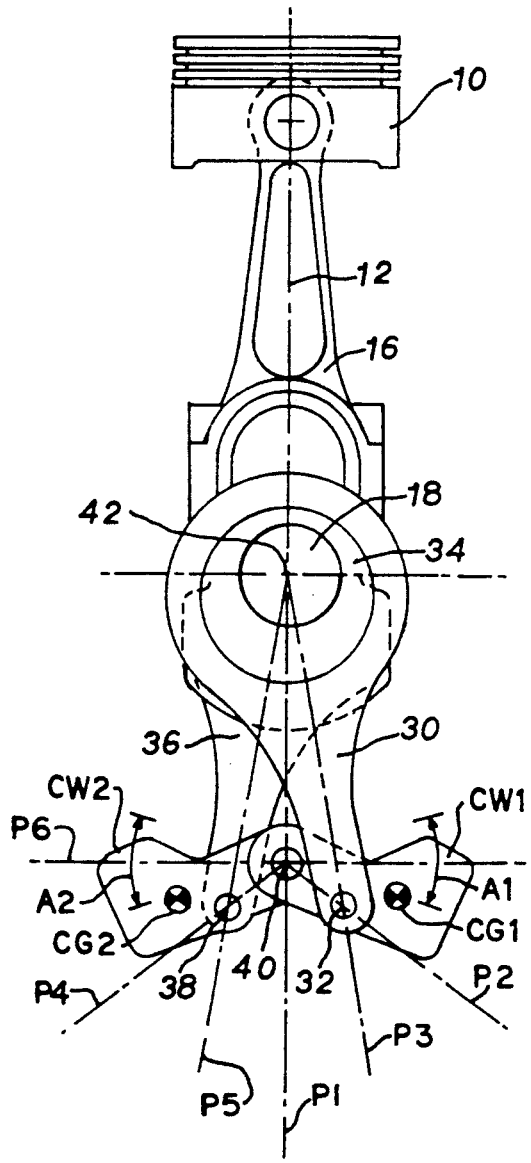
FIGS. 3A and 3B are plan views of a balancing system according to the present invention using the first method of producing non-sinusoidal balancing forces.
Figure 3B:
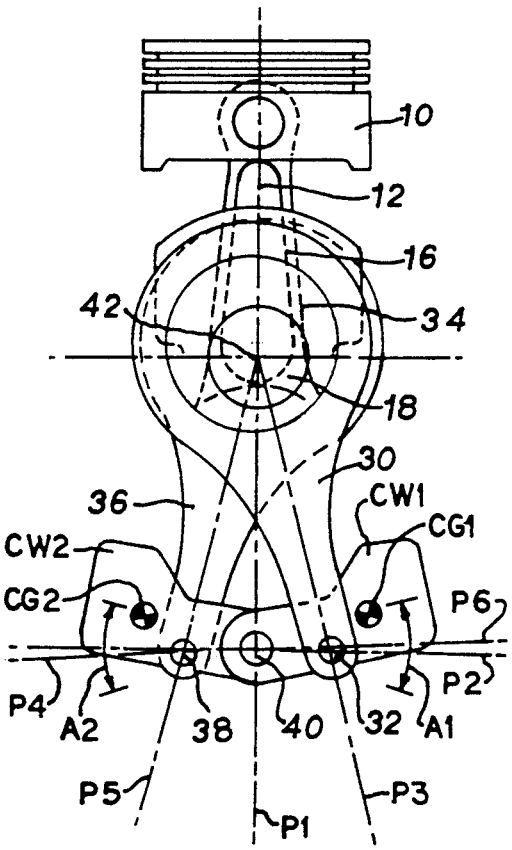

FIGS. 3A and 3B are plan views of a balancing system incorporating the first method of achieving non-sinusoidal balancing forces according to the present invention. In this first method, center of gravity CG1 of counterbalance weight CW1 and center of gravity CG2 of counterbalance weight CW2 move through arcs A1 and A2 respectively as piston 10 reciprocates along piston axis 12.

Weight CW1 is connected to a first link arm 30 at a first movable pivot axis 32. The opposite end of link arm 30 is carried by an eccentric journal 34 which in turn is affixed to crankshaft 18. Similarly, weight CW2 is connected to a second link arm 36 at a second movable pivot axis 38. The opposite end of link arm 36 is carried by an eccentric journal similar to journal 34. Weights CW1 and CW2 are also pivotally engaged at a single, central stationary pivot axis 40 that is interconnected with the crankcase housing.

In operation, rotation of crankshaft 18 rotates eccentric journal 34 and the eccentric journal carrying link arm 36, causing link arms 30 and 36 to reciprocate. The reciprocation of the link arms moves weights CW1 and CW2 so that their respective centers of gravity CG1 and CG2 move in respective arcs A2 and A2. Since more balancing is required when the piston is near its Top Dead Center position than when it is near its Bottom Dead Center position, centers of gravity CG1 and CG2 must have higher angular accelerations when they are near their respective (piston) Top Dead Center positions as depicted in FIG. 3A than when they are near their respective (piston) Bottom Dead Center positions as depicted in FIG. 3B.

Certain geometric relationships are desirable regarding the position and movement of the balancer components to achieve the varying accelerations of the centers of gravity as discussed above. These relationships are best understood by relating the position and movement of the balance components to certain defined geometrical planes.

In FIGS. 3A and 3B, a first plane P1 is defined as containing piston axis 12 and crankshaft main journal axis 42. A second plane P2 is defined as containing first movable pivot axis 32 and stationary pivot axis 40. Plane P3 is defined as containing crankshaft axis 42 and first movable pivot axis 32. Piston 10 is located on a piston side of plane P2.

The center of gravity of counterweight CW1 should be in the volume of space on the piston side of plane P2, should remain on the same side of plane P1 as movable pivot axis 32, and planes P2 and P3 should be more nearly perpendicular to each other when the piston is at Bottom Dead Center than when the piston is at Top Dead Center.

The first method of balancing the non-sinusoidal forces may be implemented using a single counterbalance weight. In that event, however, the weight itself would create side-to-side forces which would not be counterbalanced. If two counterbalance weights CW1 and CW2 are used as depicted in FIGS. 3A and 3B, the side-to-side forces created by one of the weights is balanced by the opposite side-to-side forces of the other weight.

The counterbalancing system depicted in FIGS. 3A and 3B also includes a fifth plane P5 defined as containing crankshaft axis 42 and second movable pivot axis 38. Plane P5 intersects plane P4, as depicted in FIGS. 3A and 3B. If a second counterbalance weight CW2 is used, its center of gravity should be in the volume of space on the piston side of plane P4, and on the same side of plane P1 as movable pivot axis 38. Planes P4 and P5 should also be more nearly perpendicular to each other when the piston is at Bottom Dead Center than when the piston is at Top Dead Center.

Figure 4:
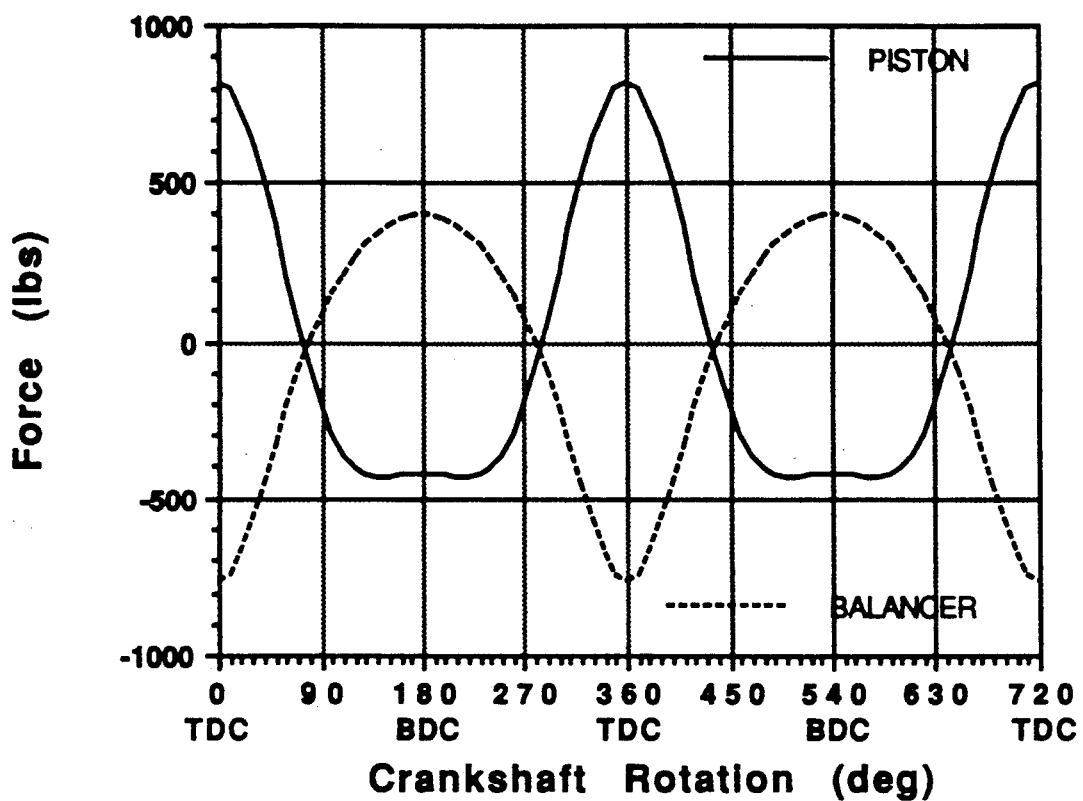
FIGS. 4A and 4B are force curves relating to the embodiment depicted in FIGS. 3A and 3B.
Figure 4:
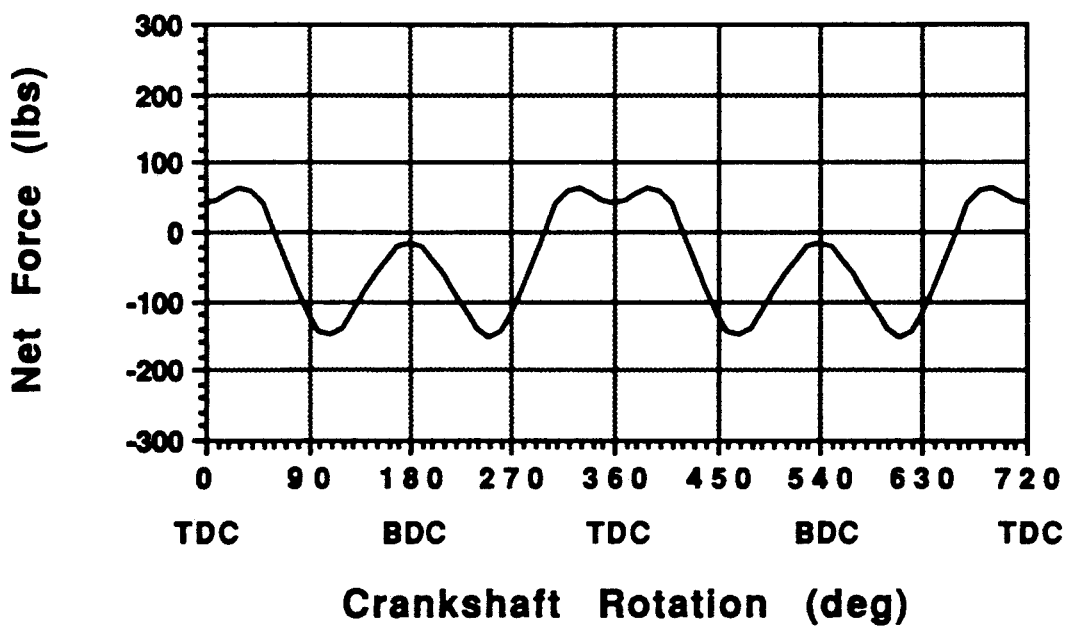

FIGS. 4A and 4B are graphs depicting the force curves versus degrees of crankshaft rotation for the balancing system depicted in FIGS. 3A and 3B. FIG. 4A depicts the piston and balancer forces for two complete cycles of piston reciprocation, beginning with the Top Dead Center position at 0 degrees. As shown in FIG. 4A, the balancer forces closely mimic and oppose the nonsinusoidal piston forces. The net force resulting from the combination of the piston and balancer forces of FIG. 4A is depicted in FIG. 4B. A comparison of FIG. 4B with the prior art graph of FIG. 2B clearly shows that the first method according to the present invention more closely mimics and opposes the non-sinusoidal piston forces.

Reference is made to FIGS. 15A and 15B to more clearly explain how the mechanism of FIGS. 3A and 3B accomplishes the first method of improved balancing by providing non-sinusoidal counterbalancing. In FIGS. 15A and 15B, the relative sizes of the eccentric journals and connecting links have been exaggerated. Prime numbers have been added to identify the parts being simulated.

In FIG. 15A, the piston is shown in two positions, at Top Dead Center, and at 30 degrees beyond Top Dead Center (in phantom). Between these two positions, the two counterbalance weights have moved through arcs B1 and B2. Note that the movements of movable pivots 32' and 38' of the counterbalance weights are primarily in opposite, sideways directions with respect to piston axis 12, and the angles between link arm 30' and plane P2', and between link arm 36' and plane P4', are substantially non-perpendicular.

In FIG. 15B, the piston is shown at Bottom Dead Center and at 30 degrees after Bottom Dead Center (in phantom). The movements of the counterbalance weights between these two positions, as represented by angles C1 and C2, are quite small when compared to angles B1 and B2. Movable pivots 32' and 38' move through a much greater angle for a given crankshaft angular travel when the piston is near Top Dead Center than when the piston is near Bottom Dead Center, indicating that the accelerations of their respective centers of gravity are greater when the piston is near Top Dead Center. Note that the angles between link arm 30' and plane P2', and between link arm 36' and plane P4' in the BDC position are substantially perpendicular, whereas in the TDC position they are substantially non-perpendicular. FIGS. 15A and 15B depict how the proper geometry produces the difference in motion and hence the desired non-sinusoidal motion of the counterbalance weights. This non-sinusoidal motion is accomplished in the manner discussed above in connection with FIGS. 3A and 3B.

Figure 16:
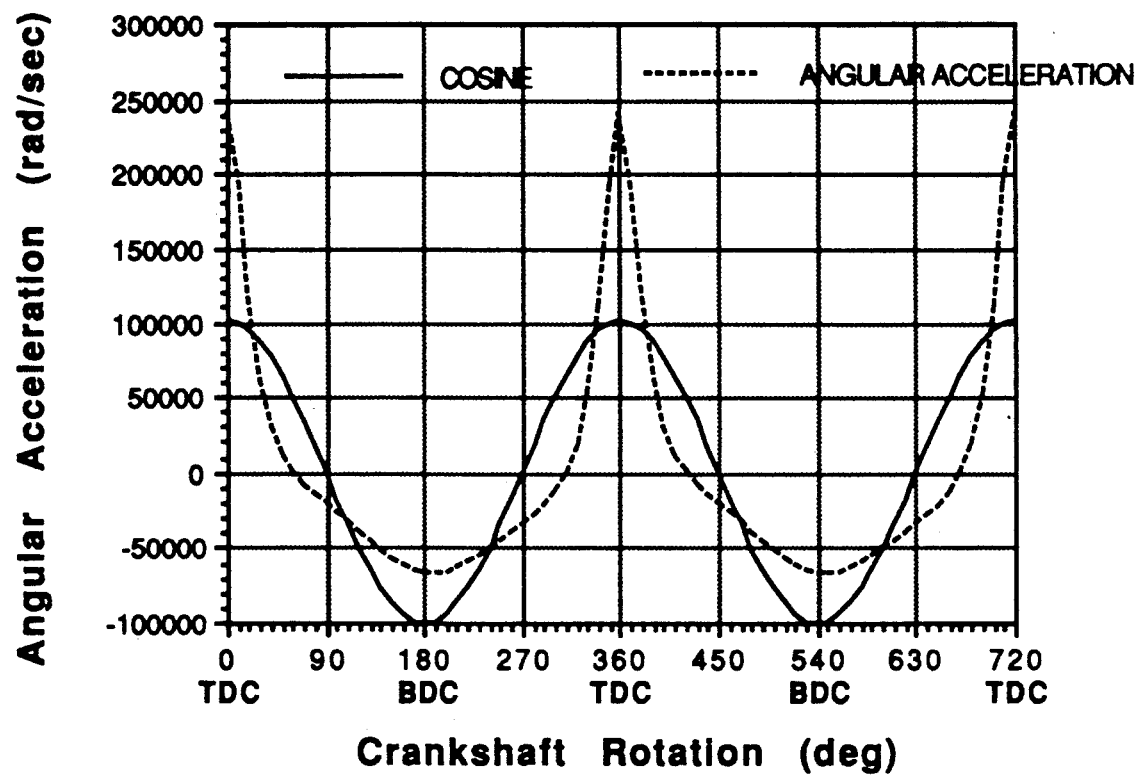
FIG. 16 is a graph depicting the angular acceleration of the counterbalance weights' centers of gravity in the balancing system depicted in FIGS. 15A and 15B.

FIG. 16 is a graph depicting the combined angular accelerations of movable pivots 32' and 38' with respect to degrees of crankshaft rotation. As shown in FIG. 16, the angular accelerations of movable pivots 32' and 38', and hence of counterbalance weights CW1' and CW2', are much greater when the piston is near its Top Dead Center position than when the piston is near its Bottom Dead position. While the curve in FIG. 16 depicting the exaggerated motion of the balancing system is not intended to closely match typical piston forces, it does show that appropriate geometries may be used to generate non-sinusoidal angular accelerations which can mimic and oppose non-sinusoidal piston forces.

The present invention also includes a second method of achieving non-sinusoidal balancing forces. According to the second method, the geometry of the balancing system is such that the angular accelerations of the counterbalance weights are essentially sinusoidal with respect to the rotation of the crankshaft. A net non-sinusoidal counterbalancing force is achieved by geometry that moves the centers of gravity of the counterbalance weights more nearly in opposition to the direction of piston motion when the piston is near its Top Dead Center position, but moves the centers of gravity of the counterbalance weights at significant angles to the direction of piston motion when the piston is near its Bottom Dead Center position. The component of the counterbalancing force opposing the piston force is thereby diminished at BDC despite sinusoidal angular acceleration, so that the counterbalance weights produce non-sinusoidal counterbalancing forces with respect to crankshaft rotation. The result is to produce greater counterbalancing forces when the piston is near Top Dead Center than when the piston is near Bottom Dead Center.

Figure 5A:
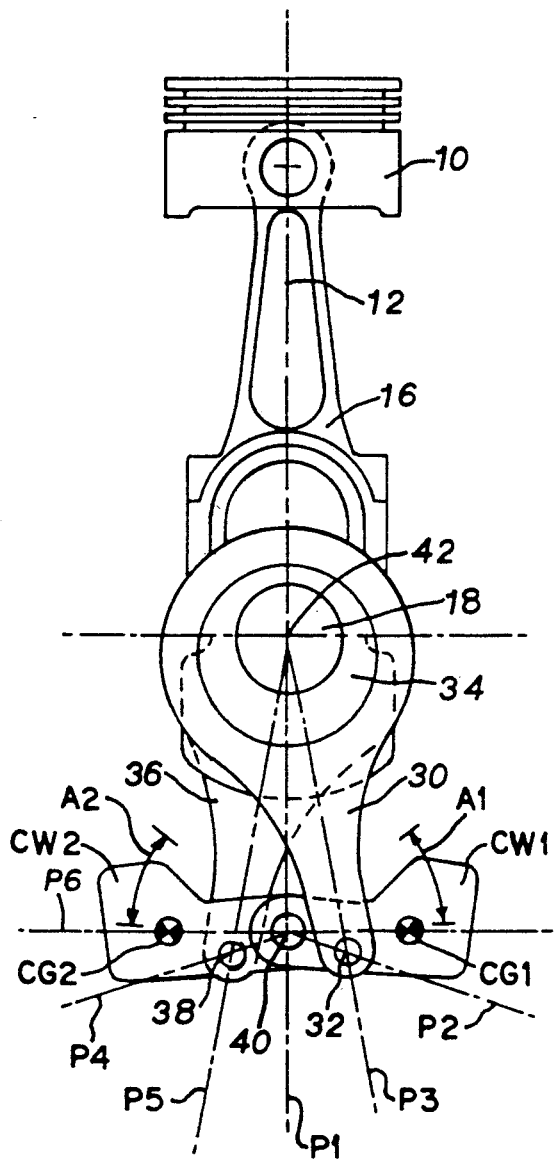
FIGS. 5A and 5B are plan views of a balancing system according to the present invention using the second method of achieving non-sinusoidal balancing forces.
Figure 5B:
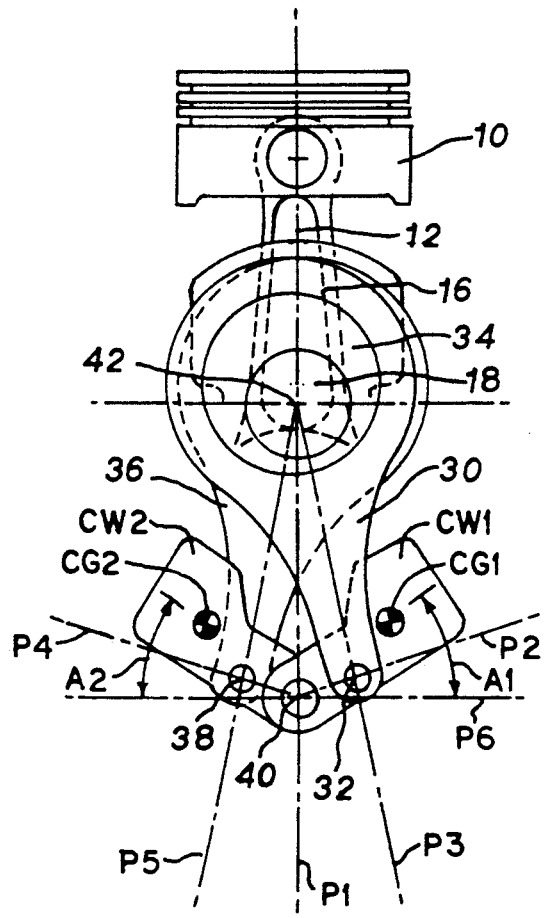

FIGS. 5A and 5B depict a balancing system according to the present invention using the second method of achieving non-sinusoidal balancing forces. In FIGS. 5A and 5B as in all the Figures, components having corresponding functions have been given the same numerical designations, it being understood that the actual orientations and shapes of the components may differ.

In FIGS. 5A and 5B, arcs A1 and A2, through which centers of gravity CG1 and CG2 respectively travel, are positioned such that their directions of movement are more closely parallel to piston axis 12 when the piston is near its Top Dead Center position (FIG. 5A)

than when the piston is near its Bottom Dead Center position (FIG. 5B).

Although the balancing system depicted in FIGS. 5A and 5B operates mechanically in a very similar manner to the balancing system depicted in FIGS. 3A and 3B, the geometry is different. In FIGS. 5A and 5B, the geometry is best understood by first defining a plane P6 as containing stationary pivot axis 40, and as being perpendicular to piston axis 12. Piston 10 lies on one side, called the piston side, of plane P6. According to this geometry, the moving first center of gravity CG1 should be substantially located on the piston side of plane P6, and first center of gravity CG1 should be further from plane P6 when the piston is near its Bottom Dead Center position (FIG. 5B) than when the piston is near its Top Dead Center position (FIG. 5A).

The non-sinusoidal balancing forces according to the second method may be achieved using a single counterbalance weight. However, such a balancing system would create unbalanced side-to-side forces. Therefore it is desirable to use two pivoting counterbalance weights as depicted in FIGS. 5A and 5B.

If a second counterbalance weight is used, the moving second center of gravity CG2 should be substantially located on the piston side of plane P6, and second center of gravity CG2 should be further from plane P6 when the piston is at its Bottom Dead Center position (FIG. 5B) than when the piston is at its Top Dead Center position (FIG. 5A).

Figure 6:
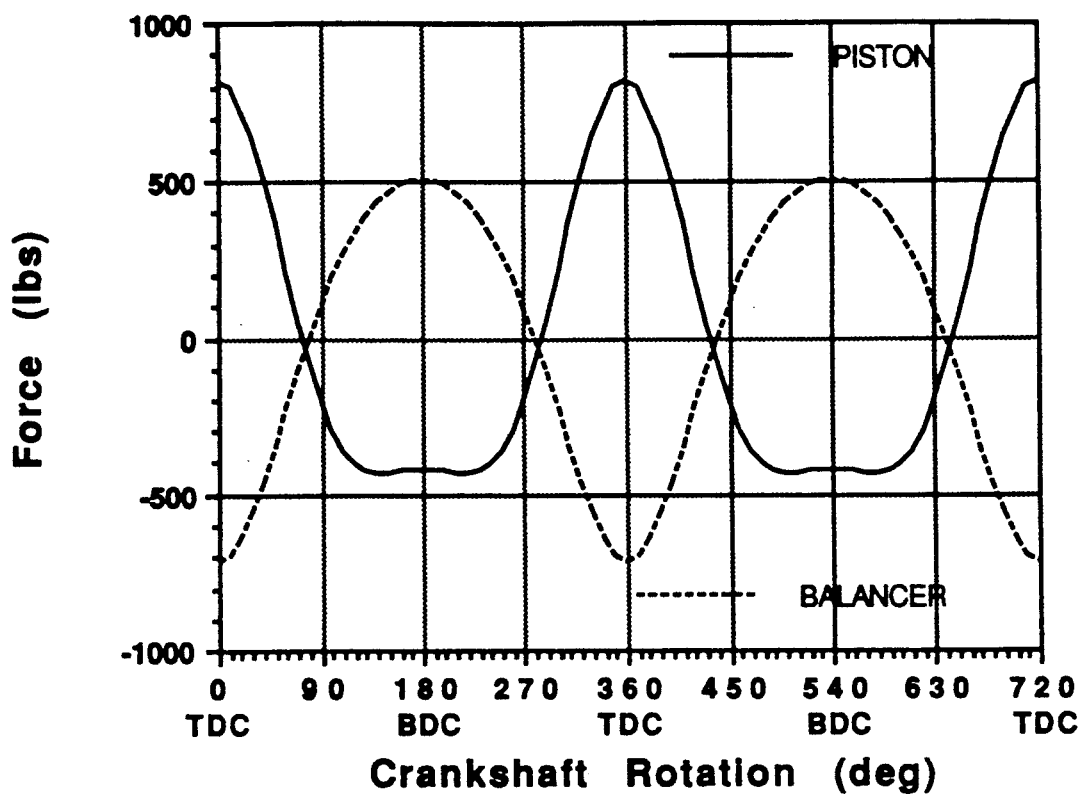
FIGS. 6A and 6B are force curves corresponding to the balancing system depicted in FIGS. 5A and 5B.
Figure 6:
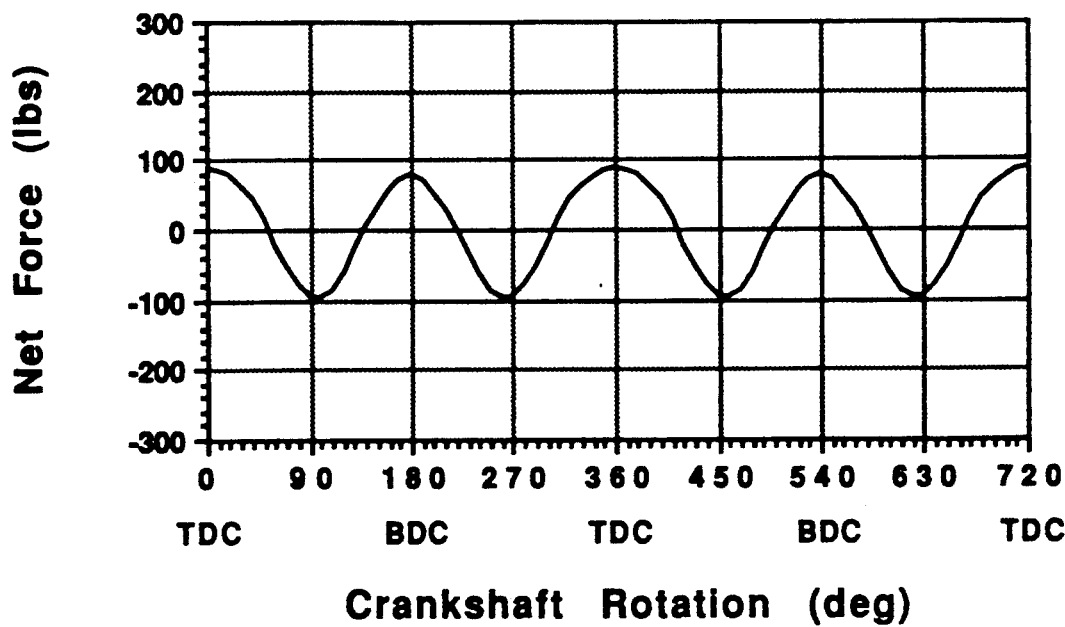

FIGS. 6A and 6B depict the piston and balancer forces for the balancing system depicted in FIGS. 5A and 5B. FIG. 6A is a graph depicting the piston forces versus the balancer forces. FIG. 6B depicts the net force resulting from the summation of the piston and balancer forces of FIG. 6A. The net force depicted in FIG. 6B is comparable to the net force resulting from the first method depicted in FIG. 4B, but is still much smaller than the net force of the prior art balancer as depicted in FIG. 2B.

Optimal balancing of the non-sinusoidal piston forces may be achieved by a balancing system according to the present invention that combines the first method and the second method discussed above. In this combined method, the angular accelerations of the centers of gravity are non-sinusoidal, and the directions of movement of the center of gravity are different when the piston is near Top Dead Center than when the piston is near Bottom Dead Center. The angular acceleration is greater when the piston is near Top Dead Center than when the piston is near Bottom Dead Center, and the directions of motion of the counterbalance weights' centers of gravity are more parallel to the piston axis when the piston is near Top Dead Center than when the piston is near Bottom Dead Center.

Figure 9A:
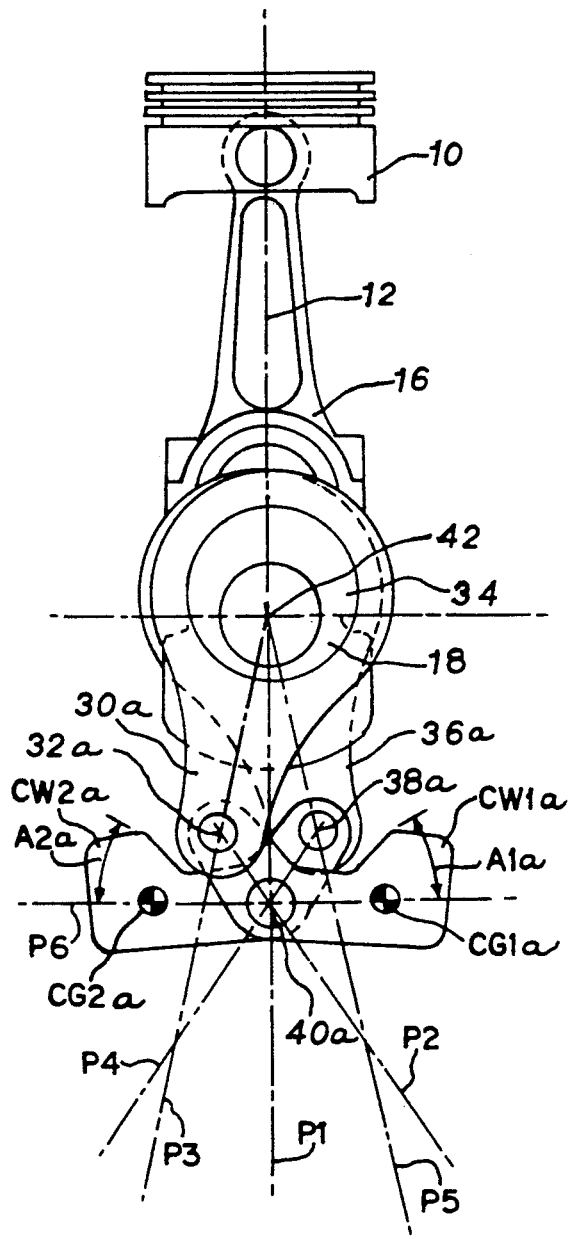
FIGS. 9A and 9B are plan views of a second embodiment of a balancing system that incorporates both the first method and the second method of achieving nonsinusoidal forces.
Figure 9B:
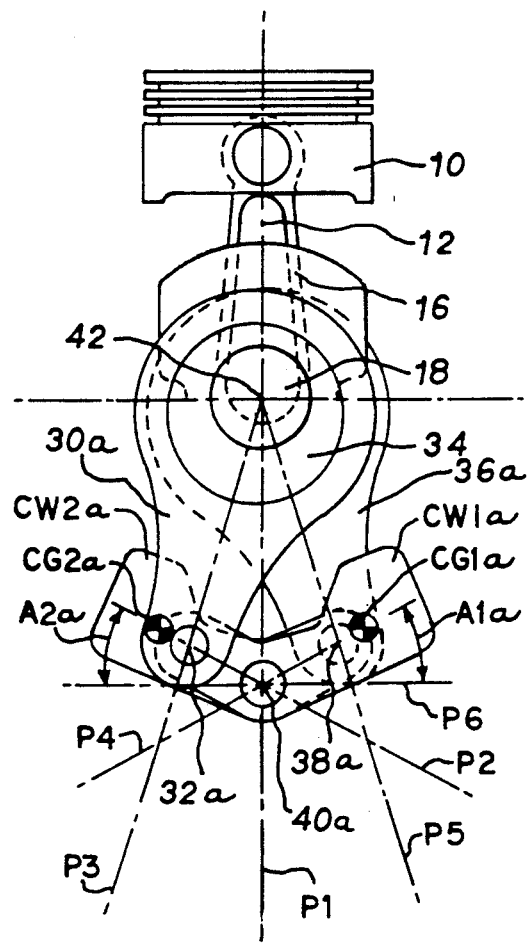
Figure 10:
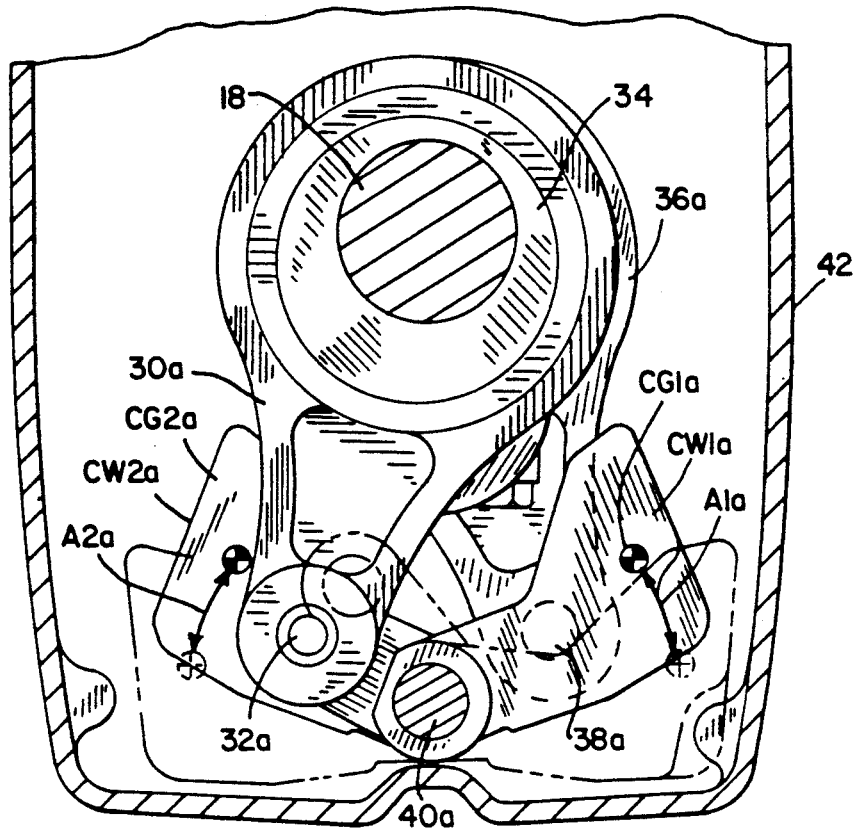
FIG. 10 is a plan view of an engine housing incorporating the balancing system depicted in FIGS. 9A and 9B.
Figure 11:
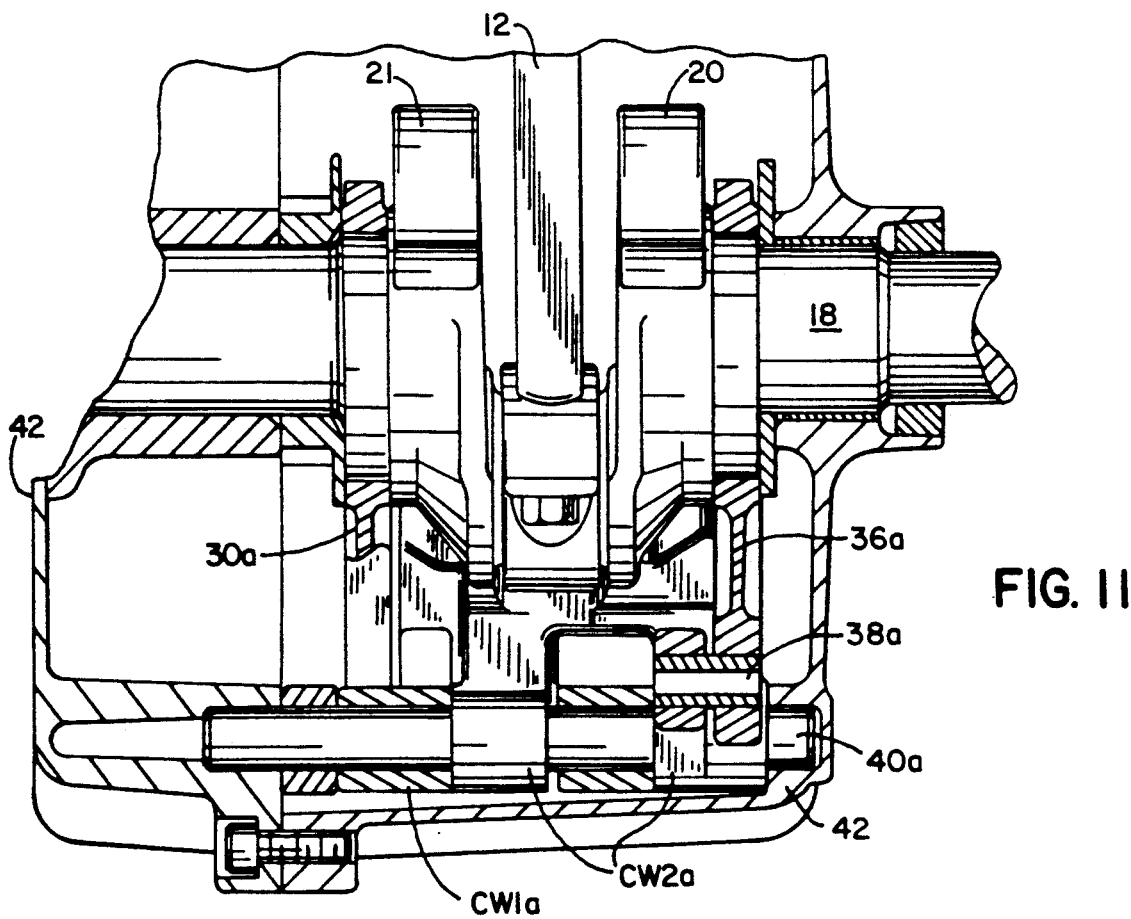
FIG. 11 is a side view of the balancing system depicted in FIG. 10.
Figure 12A:
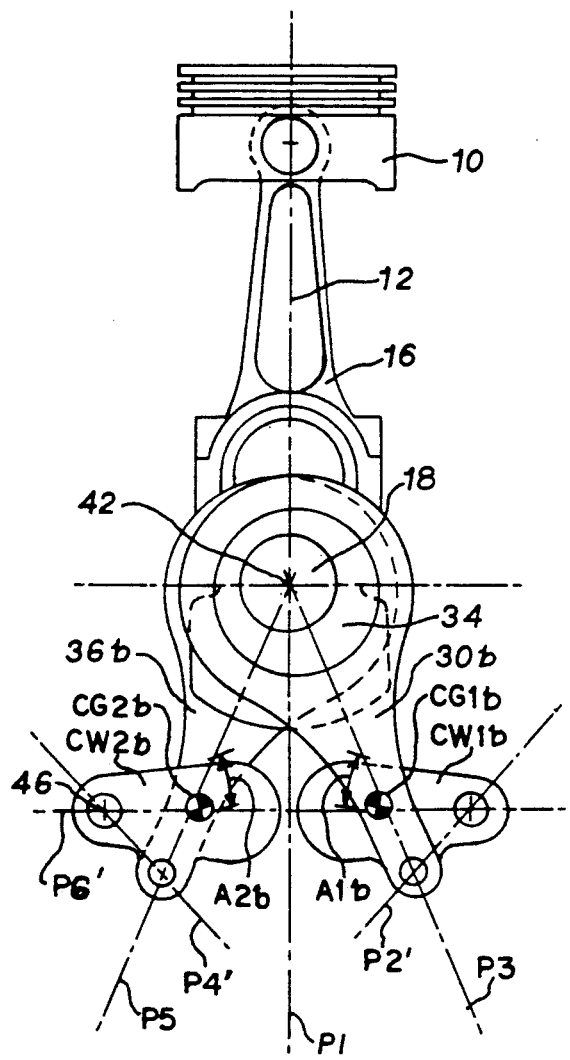
FIGS. 12A and 12B are plan views of a balancing system according to the present invention that uses both the first method and the second method of achieving non-sinusoidal forces, wherein the counterbalance weights are mounted on separate stationary pivot shafts.
Figure 12B:
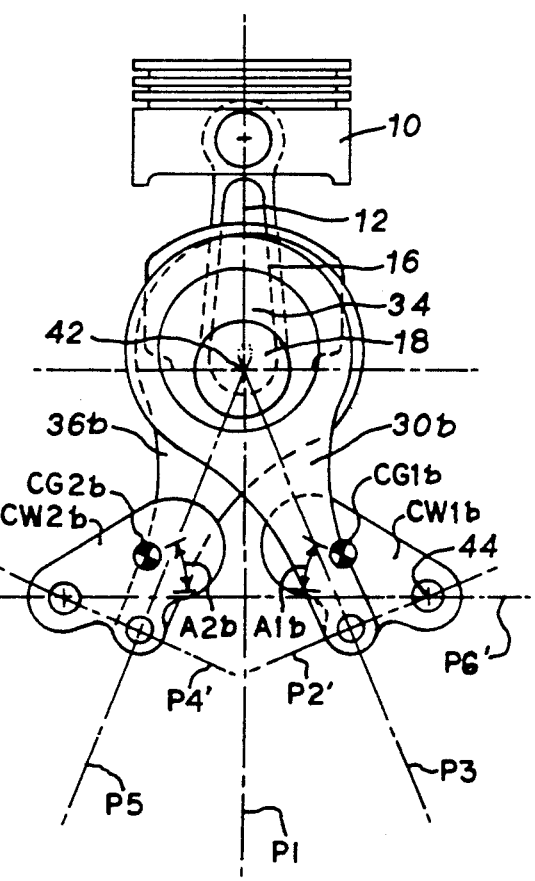
Figure 13:
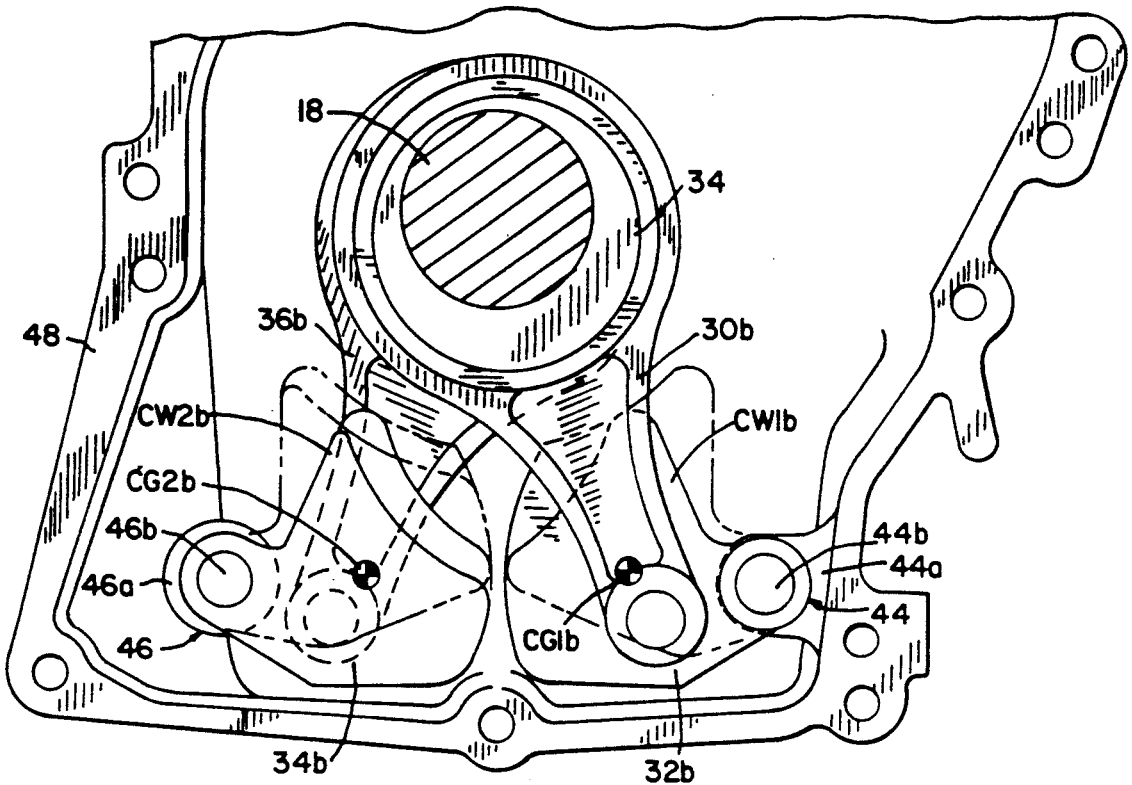
FIG. 13 is a plan view of an engine housing incorporating the balancing system depicted in FIG. 12.
Figure 14:
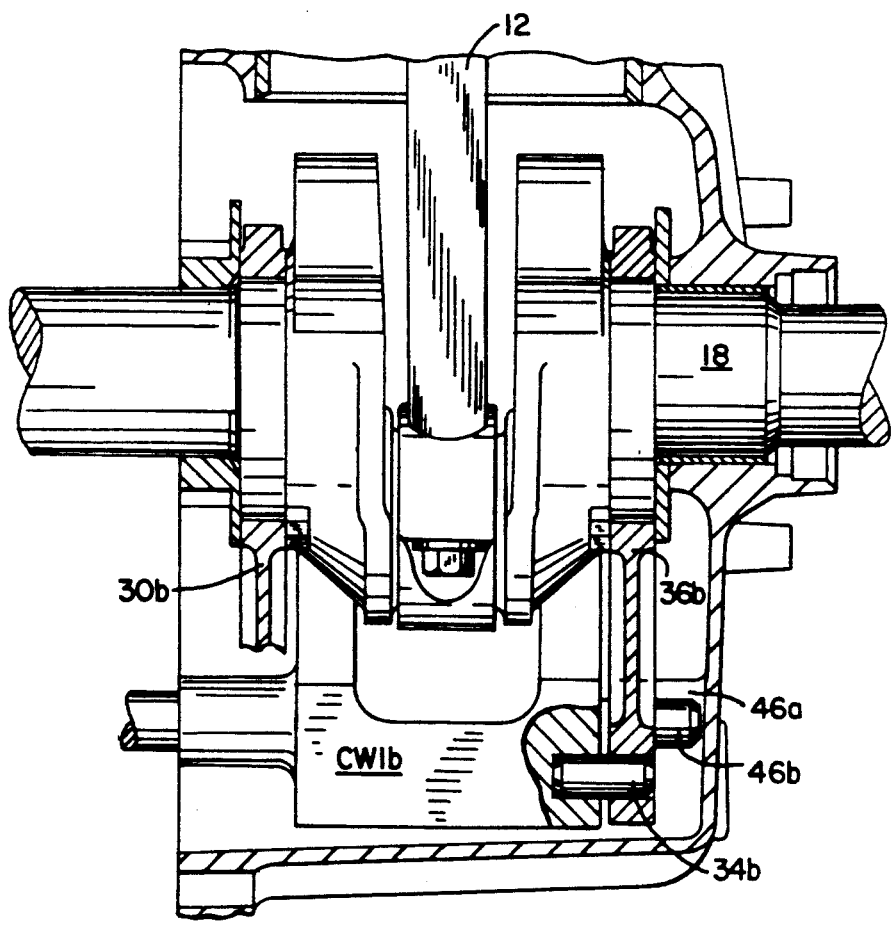
FIG. 14 is a side view of the balancing system depicted in FIG. 13.

FIGS. 7 through 14 all relate to this combined balancing system. FIGS. 7A and 7B relate to a first embodiment of the combined balancing method. FIGS. 9 through 11 relate to a second embodiment of the combined method. FIGS. 12 through 14 relate to a third embodiment. FIGS. 8A and 8B are graphs depicting force curves relating to these three embodiments.

Figure 7A:
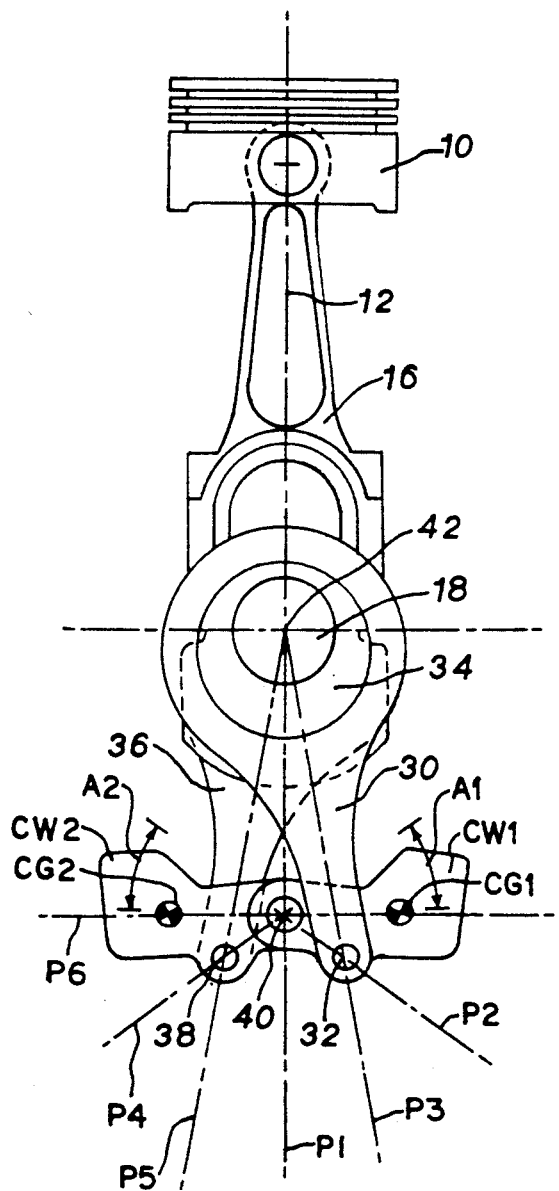
FIGS. 7A and 7B are plan views depicting a balancing system according to the present invention that incorporates both the first method and the second method of achieving non-sinusoidal balancing forces.
Figure 7B:
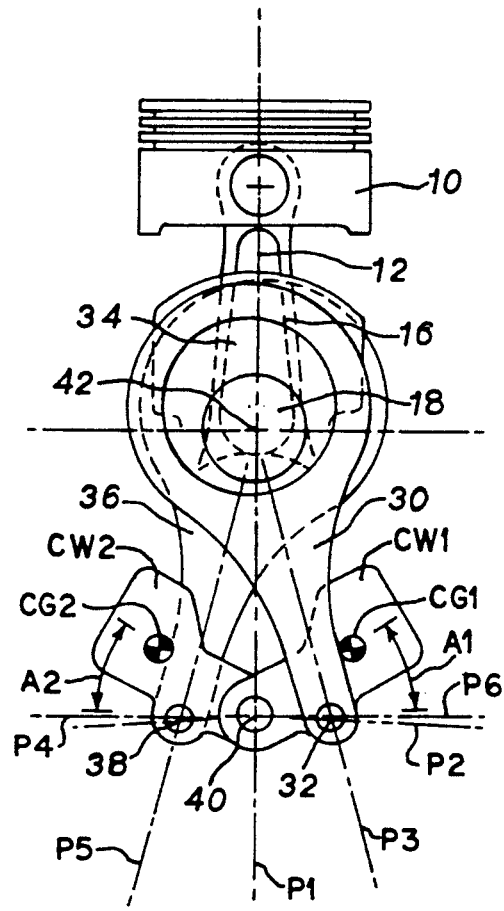
Figure 8:
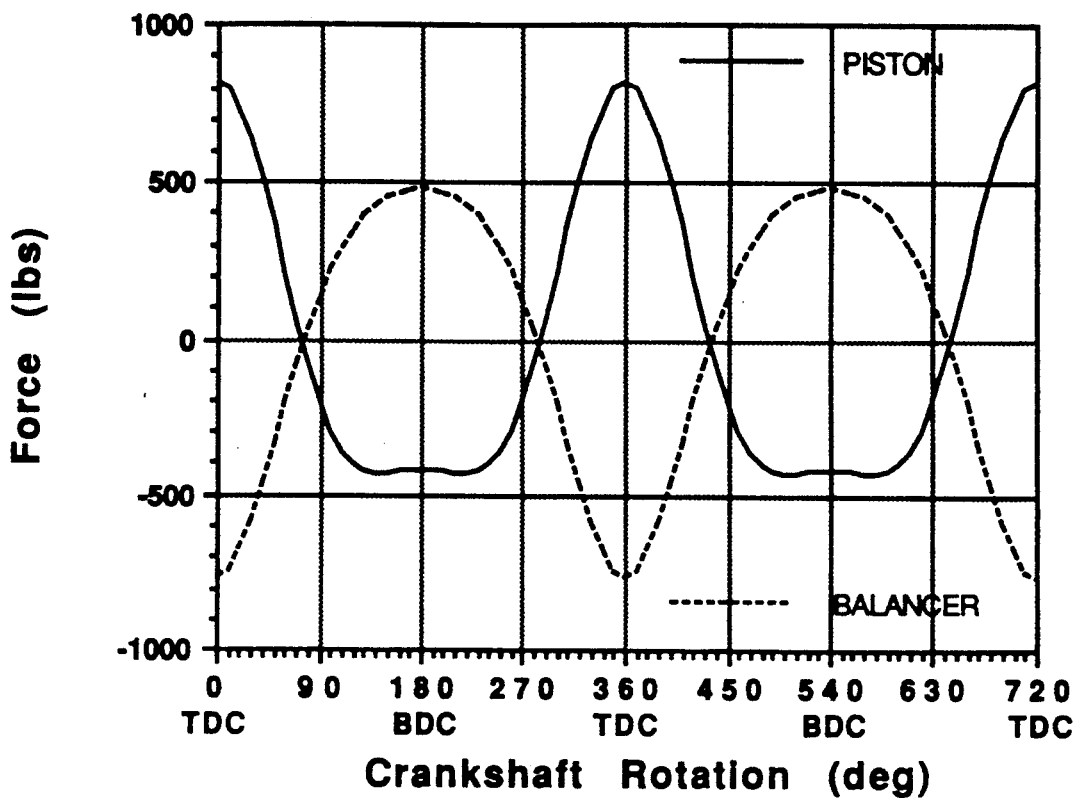
FIGS. 8A and 8B are force curves corresponding to the balancing system depicted in FIGS. 7A and 7B.
Figure 8:
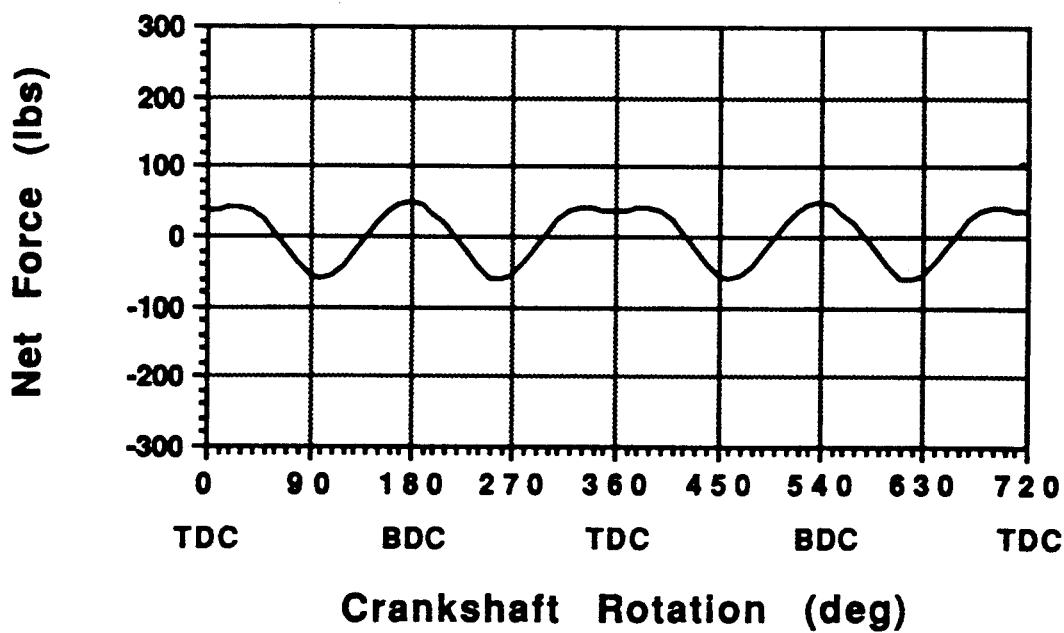

FIGS. 7A and 7B are plan views of a first embodiment of the combined balancing system. The balancing system depicted in FIGS. 7A and 7B operates in a similar manner to the above-discussed balancing system depicted in FIGS. 3A and 3B and in FIGS. 5A and 5B. Thus, a discussion of its operation will be omitted.

However, the geometry of the balancing system of FIGS. 7A and 7B differs from the geometries depicted in FIGS. 3A and 3B, and in FIGS. 5A and 5B. In FIGS. 7A and 7B the following conditions should be met to have the proper geometry:

a. the moving first center of gravity CG1 of first counterbalance weight CW1 must be substantially located on the piston side of plane P6;

b. plane P2 and plane P3 are more nearly perpendicular to each other when the piston is near its Bottom Dead Center position than when the piston is near its Top Dead Center position;

c. first center of gravity CG1 is further from plane P6 when the piston is at its Bottom Dead Center position than when the piston is at its Top Dead Center position.

The above list of conditions assumes that only a single counterbalance weight is used. For the reasons discussed above, it is preferred that two opposed counterbalance weights be used, one on each side of the piston axis. It two counterbalance weights are used, the geometry of the combined method should meet the following additional conditions:

d. the moving second center of gravity CG2 of second counterbalance weight CW2 should be substantially located on the piston side of plane P6;

e. plane P4 and plane P5 are more nearly perpendicular to each other when the piston is at its Bottom Dead Center position than when the piston is at its Top Dead Center position; and f. second center of gravity CG2 is further from plane P6 when the piston is at its Bottom Dead Center position than when the piston is at its Top Dead Center position.

The combination of the first method and the second method yields the force curves depicted in FIGS. 8A and 8B. As shown in FIG. 8A, the balancer forces of the combined method very closely mimic and oppose the non-sinusoidal piston forces. Thus, the net force as depicted in FIG. 8B is very close to zero, resulting in near optimal balancing of the piston forces.

FIGS. 9A, 9B, 10 and 11 relate to a second embodiment of the combined method according to the present invention. FIGS. 9A and 9B are plan views of the balancing system. FIG. 10 is a plan view of an engine incorporating the balancing system of FIGS. 9A and 9B. FIG. 11 is a side view of the engine depicted in FIG. 10.

The primary difference between the second embodiment depicted in FIGS. 9A and 9B and the first embodiment depicted in FIGS. 7A and 7B is that the second embodiment is designed for use in smaller engine housings. To minimize balancer space requirements, the counterbalance weights are somewhat L-shaped, and have their respective movable pivot axes on opposite sides of the piston axis from their respective centers of gravity.

In operation, the downward movement of link arm 30a will push movable pivot axis 32a toward plane P6, causing its associated center of gravity CG1a to move in an upward direction away from plane P6. The upward movement of link arm 30 causes its associated center of gravity CG1a to move in the opposite direction or downward away from the crankshaft. The second counterbalance weight CW2a is designed and connected to link arm 36a so that it moves in a similar manner as counterbalance weight CW1a.

FIGS. 10 and 11 depict the second embodiment of FIGS. 9A and 9B disposed in an engine crankcase housing 42. FIG. 10 depicts how the second embodiment maximizes the use of space within engine housing 42. FIG. 11 depicts the connection of weights CW1a and CW2a to stationary pivot 40a, and the connection of the stationary pivot to engine housing 42.

FIGS. 12A, 12B, 13 and 14 relate to a third embodiment of the combined balancing method according to the present invention. The primary difference between this third embodiment and all the other embodiments of the present invention is that the third embodiment uses two stationary pivot axes instead of the single, central stationary pivot axis used in the other embodiments. In FIGS. 12A and 12B, counterbalance weight CW1b pivots about a first stationary pivot 44 which in turn is connected to engine housing 48. Similarly, counterbalance weight CW2b pivots about a second stationary pivot 46 which is also connected to engine housing 48.

The other geometrical relationships discussed above in connection with the combined balancing method are still applicable to this third embodiment, except that plane P2 has been replaced by a plane P2' which contains first movable pivot axis 32b and first stationary pivot axis 44. Likewise, plane P4 of the prior embodiments has been replaced by a plane P4', the latter defined as the plane containing second movable pivot axis 38b and second stationary axis 46. Plane P6 of the prior embodiments has been replaced by a plane P6', defined as the plane containing first and second stationary pivot axes 44 and 46. With these substitutions, the other spatial relationships and conditions discussed above in connection with the FIGS. 7A–7B and FIGS. 9A–9B remain the same.

FIGS. 13 and 14 depict the third embodiment of FIGS. 12A and 12B having been incorporated into an engine housing 48. FIG. 13 is a plan view depicting the combined balancing system. FIG. 14 is a side view of the balancing system depicted in FIG. 13. In FIG. 13, pivot 44 includes a boss 44a that is attached to and that extends from engine housing 48 and a pivot pin 44b. Similarly, pivot 46 includes a boss 46a that is attached to and that extends from housing 48 and a pivot pin 46b. The balancing system depicted in FIGS. 13 and 14 has the same geometrical relationships and operates in the same manner as the balancing system depicted in FIGS. 12A and 12B.

Although several embodiments of the present invention have been shown and described, alternate embodiments will be apparent to those skilled in the art and are within the intended scope of the present invention. Therefore, the present invention is to be limited only by the following claims.

We claim:

1. In an engine having a cylinder in which a piston reciprocates along a piston axis, the piston being connected to a rotatable crankshaft that is mounted in a crankcase, an improved counterbalancing means comprising:
    a first counterbalance weight having a first center of gravity located on a first side of said piston axis, said first center of gravity moving in a first arc during piston reciprocation;
    a second counterbalance weight having a second center of gravity located on a second side of said piston axis, said second center of gravity moving in a second arc during piston reciprocation;
    drive means interconnected with said crankshaft for moving said first and second counterbalance weights in response to rotation of said crankshaft; and
    pivot means interconnected with said crankcase for pivotally connecting said first and second counterbalance weights to said crankcase.

2. The counterbalancing means of claim 1, wherein said drive means comprises:
    a first link arm, including
        a first end interconnected with an eccentric journal on said crankshaft;
        a second end interconnected with said first counterbalance weight; a second link arm, including
        a third end interconnected with an eccentric journal on said crankshaft; and
        a fourth end interconnected with said second counterbalance weight.

3. The counterbalancing means of claim 1, wherein said pivot means comprises:
    a stationary pivot interconnected with said crankcase and in pivotal engagement with said first counterbalance weight and with said second counterbalance weight.

4. The counterbalancing means of claim 1, wherein said pivot means comprises:
    a first stationary pivot that projects from said crankcase and that pivotally engages said first counterbalance weight; and
    a second stationary pivot that projects from said crankcase and that pivotally engages said second counterbalance weight.

5. The counterbalancing means of claim 1, wherein the accelerations of said moving first and second centers of gravity are greater when the piston is near its Top Dead Center position than when the piston is near its Bottom Dead Center position.

6. The counterbalancing means of claim 1, wherein said first and second arcs are positioned such that the directions of movement of said first and second centers of gravity are more closely parallel to said piston axis when the piston is near its Top Dead Center position than when the piston is near its Bottom Dead Center position.

7. An internal combustion engine, comprising:
    a rotatable crankshaft having a crankshaft axis;
    a piston that reciprocates along a piston axis between a Top Dead Center position and a Bottom Dead Center position in response to the rotation of said crankshaft;
    a crankcase;
    a first counterbalance weight having a first center of gravity;
    a first drive means interconnected with said crankshaft for pivoting said first counterbalance weight at a first movable pivot in response to crankshaft rotation, said first movable pivot having a first movable pivot axis;
    a first pivot means interconnected with said crankcase for pivotally engaging said first counterbalance weight at a first stationary pivot, said first stationary pivot having a first stationary pivot axis;
    a first plane containing said piston axis and said crankshaft axis;
    a second plane containing said first movable pivot axis and said first stationary pivot axis, said second plane intersecting said first plane and said piston being disposed on a piston side of said second plane;

a third plane containing said crankshaft axis and said first movable pivot axis, said third plane intersecting said second plane;

wherein said first center of gravity is disposed on the piston side of said second plane; and wherein said second plane and said third plane are more nearly perpendicular to each other when said piston is at its Bottom Dead Center position than when said piston is at its Top Dead Center position.

8. The engine of claim 7, further comprising:

a second counterbalance weight having a second center of gravity;

a second drive means interconnected with said crankshaft for pivoting said second counterbalance weight at a second movable pivot in response to crankshaft rotation, said second movable pivot having a second movable pivot axis;

a second pivot means interconnected with said crankcase for pivotally engaging said second counterbalance weight at a second stationary pivot, said second stationary pivot having a second stationary pivot axis;

a fourth plane containing the second movable pivot axis and the second stationary pivot axis, said piston being disposed on a piston side of said fourth plane;

a fifth plane containing the crankshaft axis and the second movable pivot axis, said fourth plane intersecting said fifth plane;

wherein said second center of gravity is located on the piston side of said fourth plane; and wherein said fourth plane and said fifth plane are more nearly perpendicular to each other when said piston is at its Bottom Dead Center position than when said piston is at its Top Dead Center position.

9. The engine of claim 8, wherein said first stationary pivot axis and said second stationary pivot axis coincide.

10. The engine of claim 8, wherein said first drive means includes a first link arm having one end interconnected with an eccentric journal on said crankshaft and an opposite end interconnected with said first counterbalance weight; and wherein said second drive means includes a second link arm having one end interconnected with an eccentric journal on said crankshaft and an opposite end interconnected with said second counterbalance weight.

11. The engine of claim 8, wherein said first center of gravity and said second center of gravity lie on opposite sides of said piston axis.

12. The engine of claim 8, wherein said first pivot means includes a first boss that projects from said crankcase and a first pin that pivotally connects said first boss to said first counterbalance weight;

and wherein said second pivot means includes a second boss that projects from said crankcase and a second pin that pivotally connects said second boss to said second counterbalance weight.

13. The engine of claim 7, further comprising:

fourth plane containing said first stationary pivot axis and being perpendicular to said piston axis;

wherein said piston lies on a piston side of said fourth plane;

wherein the first center of gravity lies on the piston side of the fourth plane when the piston is at its Bottom Dead Center position; and wherein the first center of gravity is further from the fourth plane when the piston is at its Bottom Dead Center position than when the piston is at its Top Dead Center position.

14. The engine of claim 8, further comprising:

a fourth plane containing said first stationary pivot axis and being perpendicular to said piston axis;

wherein said piston lies on a piston side of said fourth plane;

wherein the first and second centers of gravity lie on the piston side of the fourth plane when the piston is at its Bottom Dead Center position; and wherein the first and second centers of gravity are further from the fourth plane when the piston is at its Bottom Dead Center position than when the piston is at its Top Dead Center position.

15. An internal combustion engine, comprising:

a rotatable crankshaft having a crankshaft axis;

a piston that reciprocates along a piston axis between a Top Dead Center position and a Bottom Dead Center position in response to the rotation of said crankshaft;

a crankcase;

a first counterbalance weight having a first center of gravity;

a first drive means interconnected with said crankshaft for pivoting said first counterbalance weight at a first movable pivot in response to crankshaft rotation, said first movable pivot having a first movable pivot axis;

a first pivot means interconnected with said crankcase for pivotally engaging said first counterbalance weight at a first stationary pivot, said first stationary pivot having a first stationary pivot axis;

a first plane containing said piston axis and said crankshaft axis;

a second plane containing said first movable pivot axis and said first stationary pivot axis, said second plane intersecting said first plane and said piston lying on a piston side of said second plane;

a third plane containing said first stationary pivot axis and being perpendicular to said piston axis, said piston lying on a piston side of said third plane;

wherein the first center of gravity is located on the piston side of the second plane;

wherein the first center of gravity is located on the piston side of the third plane when the piston is at its Bottom Dead Center position; and wherein the first center of gravity is further from the third plane when the piston is at its Bottom Dead Center position than when the piston is at its Top Dead Center position.

16. The engine of claim 15, further comprising:

a second counterbalance weight having a second center of gravity;

a second drive means interconnected with said crankshaft for pivoting said second counterbalance weight at a second movable pivot in response to crankshaft rotation, said second movable pivot having a second movable pivot axis;

a second pivot means interconnected with said crankcase for pivotally engaging said second counterbalance weight at a second stationary pivot, said second stationary pivot having a second stationary pivot axis;

a fourth plane containing said second movable pivot axis and said second stationary pivot axis, said fourth plane intersecting said first plane and said piston lying on a piston side of said fourth plane;

wherein the second center of gravity lies on the piston side of the fourth plane;

wherein the second center of gravity is located on the piston side of the third plane when the piston is at its Bottom Dead Center position; and wherein the second center of gravity is further from the third plane when the piston is at its Bottom Dead Center position than when the piston is at its Top Dead Center position.

17. The engine of claim 16, Wherein said first stationary pivot axis and said second stationary pivot axis coincide.

18. The engine of claim 16, wherein said first drive means includes a first link arm having one end interconnected with an eccentric journal on said crankshaft and an opposite end interconnected with said first counterbalance weight; and wherein said second drive means includes a second link arm having one end interconnected with an eccentric journal on said crankshaft and an opposite end interconnected with said second counterbalance weight.

19. The engine of claim 17, wherein said first center of gravity and said second center of gravity lie on opposite sides of said piston axis.

20. The engine of claim 16, wherein said first pivot means includes a first boss that projects from said crankcase and a first pin that pivotally connects said first boss to said first counterbalance weight; and wherein said second pivot means includes a second boss that projects from said crankcase and a second pin that pivotally connects said second boss to said second counterbalance weight.

* * * * *